United States Patent [19]
Rothmuller

[11] Patent Number: 6,075,526
[45] Date of Patent: Jun. 13, 2000

[54] METHOD AND APPARATUS FOR SORTING AND SEARCHING A TELEVISION PROGRAM GUIDE BASED ON USER PROFILE

[75] Inventor: Michael Rothmuller, San Diego, Calif.

[73] Assignee: Hughes Electronics Corporation, El Segundo, Calif.

[21] Appl. No.: 08/762,353

[22] Filed: Dec. 9, 1996

Related U.S. Application Data

[62] Division of application No. 08/600,576, Feb. 13, 1996, Pat. No. 5,635,986.

[51] Int. Cl.[7] .................................................. H04N 5/445
[52] U.S. Cl. ................................. 345/327; 348/10; 348/1
[58] Field of Search .................................... 348/1, 2, 5, 6, 348/10, 468, 473, 553, 563, 569, 906

[56] References Cited

U.S. PATENT DOCUMENTS

| | | | |
|---|---|---|---|
| 5,479,266 | 12/1995 | Young et al. | 348/906 X |
| 5,629,733 | 5/1997 | Youman et al. | 348/13 |
| 5,686,954 | 11/1997 | Yoshinobu et al. | 348/13 |
| 5,710,601 | 1/1998 | Marshall et al. | 348/564 |

FOREIGN PATENT DOCUMENTS

WO 94/14284   6/1994   WIPO ............................... H04N 7/16

*Primary Examiner*—Nathan Flynn
*Attorney, Agent, or Firm*—John T. Whelan; Michael W. Sales

[57] ABSTRACT

A method and apparatus for searching a program guide comprising program information for a plurality of different program sources. The program information includes the titles of the programs, the channel on which each program is to be shown, and the time at which each program is to be shown. The viewer first enters the title of a desired program. The program guide is then reviewed so as to identify each occurrence of the title of the desired program. If the desired program is contained in the guide, the time and channel associated with each identified occurrence of the program is displayed.

22 Claims, 5 Drawing Sheets

PROGRAM GUIDE WED, NOV 23 · 12:33PM
COMPLETE  NORMAL ( MAIN MENU ) ( CATEGORIES ) ( TYPES ) ( LISTS ) ( GUIDES ) ( CLASSES )

| TODAY | 12:30 PM | 1:00 PM | 1:30 PM |
|---|---|---|---|
| DTV 200 | DIRECTV | | DIRECTV |
| CNN 202 | CAPITAL GANG | SPORTS | NEWS |
| CRT 203 | VERDICTS & JUSTICE | ✓ INSTANT JUSTICE | |
| TNT 212 | SINBAD AND THE EYE OF THE TIGER | | |
| TBS 233 | BULLITT | | |
| CSPN 242 | C-SPAN | C-SPAN | C-SPAN |
| A&E 256 | 55 DAYS AT PEKING | | |

FIG. 2

METHOD AND APPARATUS FOR SORTING AND SEARCHING A TELEVISION PROGRAM GUIDE BASED ON USER PROFILE

This application is a Divisional under 37 CFR 1.60 of application Ser. No. 08/600,576, filed on Feb. 13, 1996, now U.S. Pat. No. 5,635,980 the entire contents of which are hereby incorporated by reference.

BACKGROUND OF THE INVENTION

1. Field of the Invention

The present invention relates generally to a subscription television system, and more particularly, to a method and apparatus for sorting and searching program guides based on the viewer's favorite programs.

2. Description of the Prior Art

As the subscription television industry has grown, providers of subscription television continually offer more and more channels to the individual subscriber. Typical systems offer more than 100 different channels. Such systems also typically display a channel or program guide, which identifies all available channels, the programs currently airing on each channel and upcoming programs.

For example, U.S. Pat. No. 4,751,578, U.S. Pat. No. 5,353,121 (the '121 patent), U.S. Pat. No. 5,253,066, all of which are herein incorporated by reference, disclose typical channel guides. As shown, for example, in FIG. 1 of the '121 patent, the channel guide comprises a plurality of channel identifiers and a listing of the shows and programs upcoming on each channel. The channel guide illustrated in FIG. 1 is sorted (i.e., arranged or ordered) by channel number (i.e., program source).

Such known systems for generating channel guides allow the viewer to sort the guide on the basis of predefined categories or themes, such as, movies, sports, news, etc., or by a user defined favorite channel list. Sorting the channel guide by themes allows the viewer to display a subset schedule of the entire channel guide, which contains only programs in the selected category. The user defined favorite channel list allows the user to specify favorite channels and then define the order in which those channels will be displayed in the channel guide.

Notwithstanding the foregoing methods of sorting and displaying the channel guide, the necessity to scan over a significant number of channels, typically in excess of 100, in an effort to determine whether a specific television program is airing currently, or sometime in the near future, remains a significant problem. For example, assuming the viewer desires to watch an episode of Star Trek™, current systems do not provide a simple means for the user to determine the next time the program will be broadcast or aired. Indeed, at any given time, Star Trek™ could be airing on any of a number of channels. As such, the viewer would be forced to scan the entire guide and review programs currently airing, as well as future events for all channels, to determine all scheduled broadcasts of the desired program. With the plethora of channels provided by most systems, this searching can require a considerable amount of time.

Accordingly, there exists a need for displaying and sorting a channel guide which allows the viewer to readily determine and identify when a desired program will be broadcast without the viewer having to perform an extensive search on the entire channel guide for current and future events.

SUMMARY OF THE INVENTION

The present invention provides a method and apparatus for sorting and displaying a channel guide which satisfies the aforementioned needs. Specifically, the present invention provides a method and apparatus for sorting and displaying a channel guide based on the name or title of the program.

The present invention relates generally to a method of searching a program guide comprising program information for a plurality of different program sources. The program information includes the titles of the programs, the channel on which each program is to be shown, and the time at which each program is to be shown. According to the novel method, the viewer first enters the title of a desired program. The program guide is then reviewed so as to identify each occurrence of the title of the desired program. If the desired program is contained in the guide, the time and channel associated with each identified occurrence of the program is displayed on a display screen.

The present invention also relates generally to a method of generating a favorite program list from a program guide comprising program information, including the titles of the programs, for a plurality of different program sources. The method comprises the steps of monitoring the duration of time a given program is selected for viewing, and then storing the title of the program in memory means if the program is selected for viewing for a prespecified period of time. The titles of programs stored in the memory means form the favorite program list.

The present invention also relates generally to an alternative method of generating a favorite program list from a program guide comprising program information, including the titles of the programs, for a plurality of different program sources. The method comprises enabling a viewer to designate the title of a program to be included on the favorite program list, and then storing the title of the viewer-designated program in memory means. The titles of programs stored in the memory means form the favorite program list.

The present invention also relates generally to a method of notifying a viewer when a predetermined favorite program is to be broadcast. The method comprises generating a favorite program list which includes the titles of programs, analyzing the favorite program list to determine if any program on the favorite program list is included in a program guide comprising program information for a plurality of different program sources, and notifying the viewer, for example, via an on-screen message or prompt, if any program on the favorite program list is included in the program guide.

As described in detail below, the method and apparatus of the present invention provide important advantages over the prior art. Most importantly, the present invention allows the viewer to readily determine and identify when a desired program will be broadcast without the need for performing an extensive search of the entire channel guide for current and future events.

The invention itself, together with further objects and attendant advantages, will best be understood by reference to the following detailed description, taken in conjunction with the accompanying drawings.

BRIEF DESCRIPTION OF THE DRAWINGS

FIG. 2 illustrates an exemplary program guide produced by the apparatus of FIG. 1.

DETAILED DESCRIPTION OF THE DRAWINGS

Figure 1:
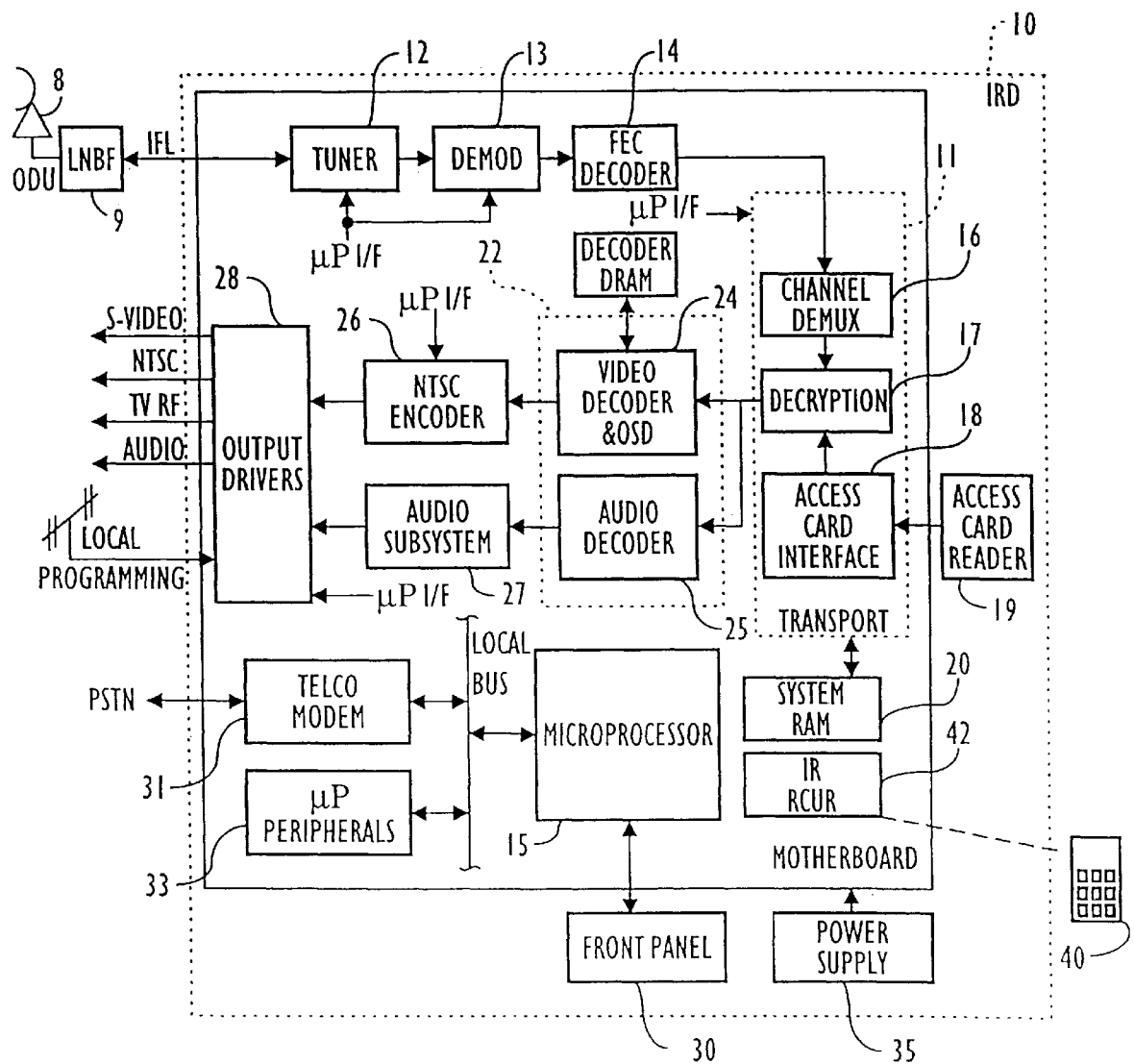
FIG. 1 is a functional block diagram of an apparatus capable of generating program guides and display screens in accordance with the present invention.

FIG. 1 is a functional block diagram of an apparatus 10 capable of generating program guides and display screens in accordance with the present invention. As shown in FIG. 1, the apparatus 10 includes receiving means comprising tuner 12, demodulator 13 and FEC decoder 14. The receiving means is controlled by a microprocessor 15, and operates to receive a signal which includes program guide information, and video and audio information for all channels available on the given system.

In the embodiment of FIG. 1, an antenna 8 and low noise filter 9 function to receive the signal from a satellite source and to couple the signal to the tuner 12 of the receiving means of the apparatus 10. However, it is noted that the present invention is not limited to system providers which utilize satellite transmissions to broadcast signals. The novel system of the present invention could be readily used with system providers who supply signals via, for example, cable or telephone lines. The program guide information could also be provided via such mediums as CD ROM.

Upon receipt of the signal, tuner 12 functions to down-convert the received signal to an intermediate frequency ("IF") signal. The IF signal is then converted to a digital equivalent by the demodulator 13 and coupled to FEC decoder 14, which provides forward error correction on the received signal.

Apparatus 10 also comprises a transport chip 11. The transport chip 11 preferably comprises a channel demultiplexor 16, a decryption unit 17 and an access card interface 18. The output of the FEC decoder 14 is coupled to the channel demultiplexor 16, which functions to separate the audio and video information of each channel, and also separates the program guide information. Under control of the microprocessor 15, the channel demultiplexor 16 provides at its output port, the audio and video information of a selected channel or the program guide information.

Transport chip 11 further comprises an access card reader 19 which is coupled the access card interface 18. The access card interface 18 operates in conjunction with the decryption unit 17 and the access card reader 19 to provide a means of preventing, for example, unauthorized pay-per-view movies from being ordered by children.

Apparatus 10 further comprises a telco modem 31 which allows the microprocessor 15 to be coupled to the public telephone network, microprocessor peripherals 33, such as CD ROM, and a power supply 35 for supplying power.

In the satellite system illustrated in FIG. 1, multiple transponders located in a satellite (not shown) are utilized to transmit channel information (e.g., audio, video) to the apparatus 10. Each transponder transmits information regarding multiple channels (i.e., multiple program sources, such as ABC, CBS, etc.). However, each transponder also transmits the program guide information for every channel provided by the system provider on one of the frequencies available within the given transponder.

As such, regardless of which transponder the tuner 12 is tuned to, the program guide information is available at the output of the channel demultiplexor 16. Under control of the microprocessor 15, the program guide information is stored in random access memory ("RAM") 20, which is coupled to the transport chip 11. The system RAM 20 also functions to buffer the digital data associated with the audio and video data of a given channel.

The microprocessor 15 operates to periodically update the program guide information stored in the system RAM 20. In the present embodiment, the program guide information is preferably updated one of two ways. First, the microprocessor 15 periodically analyzes the program guide information transmitted by the system provider to determine if the information has been updated. This can be accomplished, for example, by utilizing a flag bit which indicates that the program guide has been modified. If the program guide has been modified, the microprocessor 15 stores the updated guide in the system RAM 20. Second, as an independent process, the microprocessor 15 monitors an expiration date/time transmitted along with the program guide information. Upon reaching the expiration date/time, the microprocessor 15 updates the program guide stored in system RAM 20 with the program guide currently being transmitted.

Returning to FIG. 1, the apparatus 10 of the present invention further comprises a MPEG chip 22. The MPEG chip 22 comprises a video decoder and an on-screen display 24, and an audio decoder 25. The MPEG chip 22 functions to decompress the audio and video data output by the channel demultiplexor 16, which is transmitted by the provider in a compressed format. The NTSC encoder 26 and audio subsystem 27 format the decompressed audio and video data, respectively, for display on, for example, a television receiver. The output drivers 28 function to transmit the audio and video information of a selected channel to the display screen of the television receiver.

In the event the subscriber/viewer selects to display the program guide, which can be accomplished by selecting the predefined channel associated with the program guide, via front panel 30 or a remote control 40, the microprocessor 15 retrieves the program guide information from system RAM 20, and then accesses a font table stored in memory. The microprocessor 15 then converts the program guide information stored in memory 20 into a displayable font data. The displayable font data is then coupled to the MPEG chip 22. As described above, the MPEG chip 22 in combination with NTSC encoder 26 and the output drivers 28, functions to write the program guide information to the television receiver at the start of the next available frame.

FIG. 2 illustrates an exemplary program guide produced by apparatus 10. As shown in FIG. 2, each screen of the program guide comprises approximately seven program sources and the corresponding programs. The program source and the programs being shown thereon are displayed on a single line comprising multiple cells of varying length. The first cell in each line indicates the program source and the channel number assigned to the source. In order to view additional program information, the viewer simply presses a designated key, such as a page down key (i.e., scroll down key), and the foregoing process is repeated for the new program data to be displayed.

Figure 3:
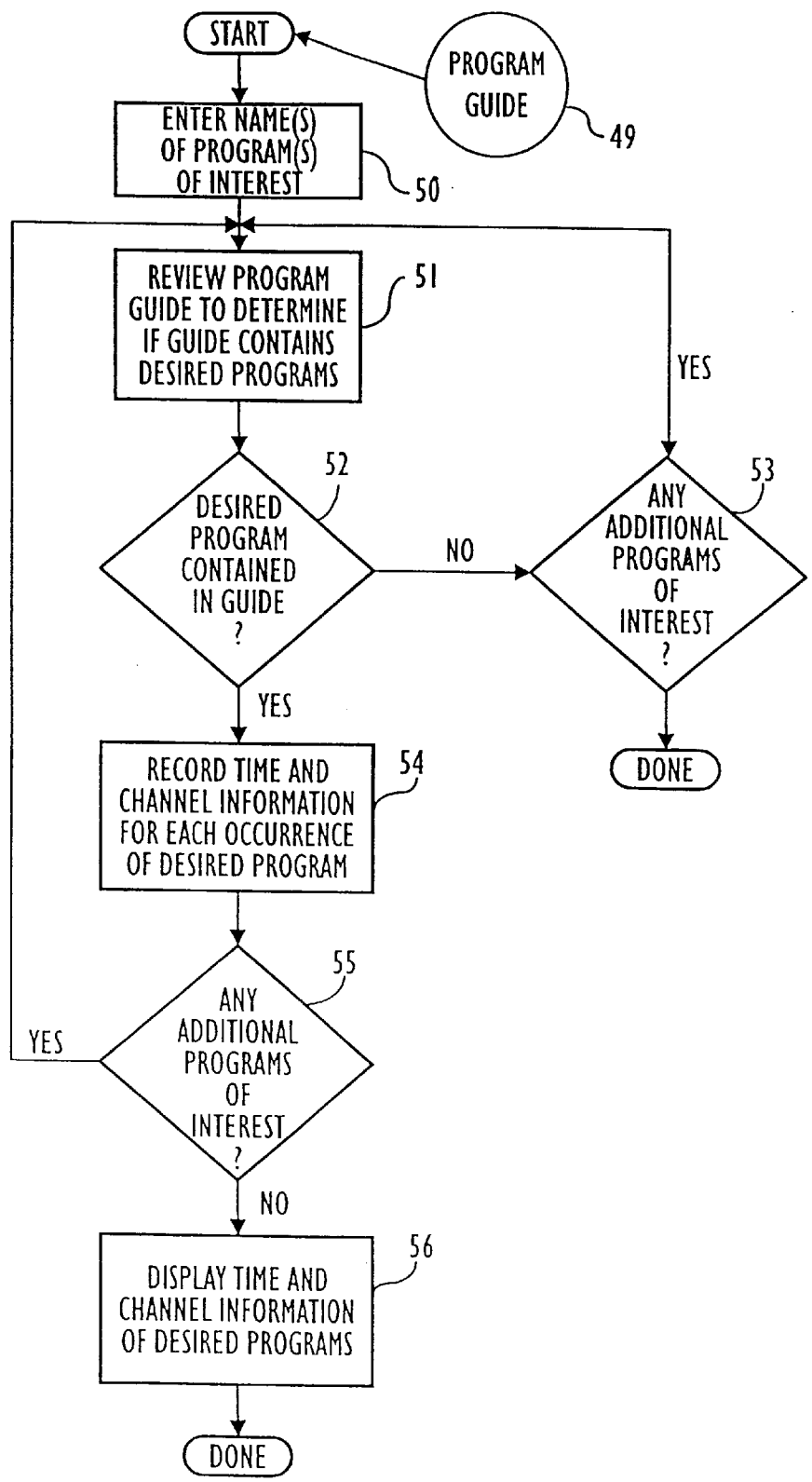
FIG. 3 is a flow chart illustrating a method of generating a display screen identifying each occurrence of a specified program in accordance with the present invention.

In accordance with the present invention, the apparatus 10 is also capable of generating a display screen identifying each occurrence of user-specified programs of interest (i.e., favorite programs). FIG. 3 is a flow chart illustrating a method of generating such a display screen. Referring to FIG. 3, the first step 50 in the method requires the viewer to enter the title of each program of interest (e.g., Star Trek™). One method of entering the title of the program is via an infra-red "IR" remote 40 control device. (The IR remote 40 includes a switch array which provides means for users to issue instructions to the microprocessor 15. The IR remote 40 communicates with the microprocessor 15 via IR receiver 42.) To enter the title, the viewer maneuvers a cursor on the program guide 49, for example, as shown in FIG. 2, so as to highlight the program of interest. Once the program is highlighted, the viewer depresses a SEARCH key provided on the IR remote 40.

Depression of the SEARCH key commands the microprocessor 15 to determine if the program currently highlighted by the viewer is contained anywhere else in the program guide (Step 51). More specifically, upon depression of the SEARCH key, a search command is forwarded to the microprocessor 15 via the IR receiver 42. Upon receipt of the search command, the microprocessor 15 records the title of the program currently identified and compares the recorded title with the title of each program contained in the current program guide 49 stored in RAM 20 (Step 52). If no additional matches are found, the process proceeds to Step 53 to determine if any additional program titles need to be compared to the program guide 49. If there are no additional program titles, the process is complete.

Returning to step 52, if additional matches are found, the microprocessor 15 records the channel of broadcast and time of broadcast of each occurrence of the program (Step 54), and then proceeds to determine if additional program titles need to be compared to the program guide 49 (Step 55). If not, the process proceeds to Step 56 and displays the time and channel information recorded in Step 54 for each occurrence of a desired program. The information is displayed on the display screen via the same components utilized to display the program guide. Or a Alternatively, the title of the desired program can be entered via a keyboard (not shown) and/or an IR remote which provides for entry of alphanumeric characters. The keyboard or IR remote must be coupled to the microprocessor via an appropriate data channel. According to this entry method, the viewer types the title of the program to be located. The viewer then depresses a SEARCH key located on the keyboard or IR remote, which causes the transfer of the program title to the microprocessor 15, and which commands the microprocessor 15 to perform the search as described above.

As noted, the foregoing method of the present invention provides for multiple programs to be searched simultaneously. More specifically, during the title entry process, the viewer may enter multiple titles, either by highlighting multiple titles or via the keyboard. In the event that multiple titles are entered, the microprocessor 15 searches the program guide 49 currently stored in RAM 20 for each program title, and all occurrences of each program title are identified on the display screen.

It is also noted that all steps subsequent to step 50 in the foregoing process are performed automatically by the microprocessor 15.

As mentioned above, the present invention also relates to a method for automatically generating a favorite program list. The favorite program list identifies by title, the programs most frequently watched by the viewer. The favorite program list can also include information, such as, the time and channel of the next occurrence of each program contained in the favorite program list.

Figure 4:
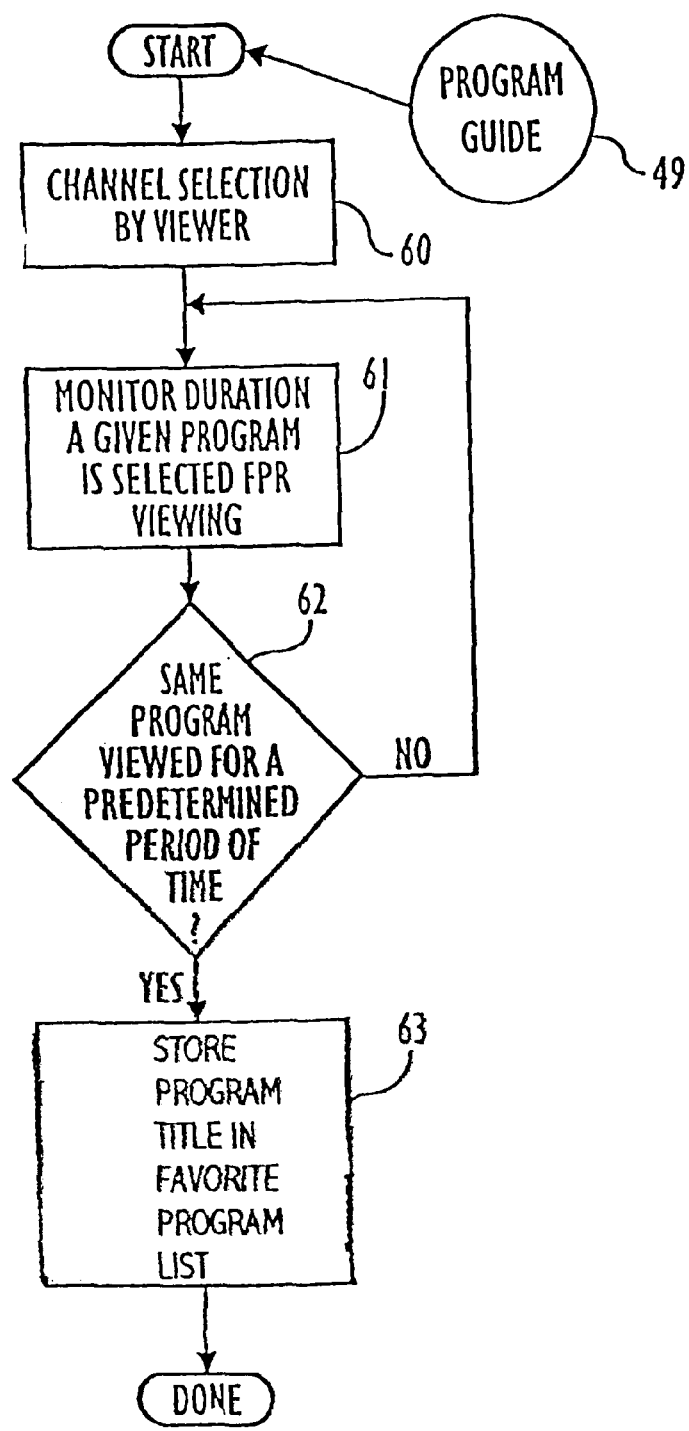
FIG. 4 is a flow chart illustrating an exemplary method of generating a favorite program list.

FIG. 4 is a flow chart illustrating an exemplary method for automatically generating a favorite program list. As shown in FIG. 4, once the viewer selects a channel for viewing (step 60), the microprocessor 15 records the time the viewer selected the channel and the name (i.e., title) of the program currently broadcasting on the selected channel. If the viewer continuously views the same program for a predetermined period of time, the microprocessor 15 functions to store the title of the program in memory, for example, system RAM 20. Each time a given program is viewed for a period of time exceeding the predetermined period of time, the program title is stored in memory. The list of program titles stored in memory 20 forms the favorite program list.

More specifically, the microprocessor 15 operates to tune the tuner 12 to the desired channel in response to the viewer's channel selection (Step 60). In accordance with the present method, upon forwarding a tuning command to the tuner 12, the microprocessor 15 records the selected channel and starts a counter (Step 61). The microprocessor 15 also records the title of the program currently broadcasting on the selected channel. The title of the program is obtained by retrieving the program guide information associated with the selected channel from memory 20. As noted above, the program guide information for every channel is transmitted by the system provider and stored in memory 20. If the viewer continues watching the same program for a predetermined period of time (Step 62), the microprocessor 15 stores the title of the program in memory 20 in a list, which has heretofore been referred to as the favorite program list (Step 63). The predefined period of time is programmable, and can be set by the viewer.

Each time a program is viewed for a duration exceeding the predetermined period of time, the microprocessor 15 will function to store the title of the program on the favorite program list. The microprocessor 15 also functions to store the date and time the program title was added to the favorite program list. If the program title is already on the list, the microprocessor 15 simply functions to update the date and time stamp of the given program. Furthermore, the microprocessor 15 can be programmed to arrange the ordering of the programs contained on the favorite program list on the basis of which programs are most frequently watched. Thus, the most watched program will appear first in the favorite program list, the second most frequently watched program will appear second, and so on. Of course, the microprocessor 15 will arrange the ordering of the list as necessary to maintain the proper order.

The present method also provides for the deletion of program titles from the favorite program list. For example, in the event that the memory allocated for the favorite program list is full and a new program title should be stored, the microprocessor 15 will determine the program title having the oldest (i.e., most prior in time) date/time stamp and then replace the oldest program title with the new program title to be stored.

Another method of deleting program titles from the favorite program list is to automatically remove the program title from the list after expiration of a predefined time period. According to this method, if the date/time stamp associated with a given program exceeds the predefined time, for example, two months, the program title is removed from the list. The microprocessor 15 can be programmed to periodically review the favorite program list to determine if any programs should be deleted. This method provides a means for automatically "aging" programs off the favorite program list. The period of time prior to expiration is also programmable, and can be set by the viewer.

In an alternative method for generating a favorite program list, the viewer designates the titles of the programs to be included on the favorite program list. More specifically, the viewer commands apparatus 10 to display the program guide 49 on the display screen. Then, the viewer maneuvers a cursor on the program guide so as to highlight the program of interest. Once the program is highlighted, the viewer depresses a FAV-STORE key provided on the IR remote 40.

Depression of the FAV-STORE key commands the microprocessor 15 to determine if the program currently highlighted by the viewer is contained on the favorite program list. More specifically, upon depression of the FAV-STORE key, a command is forwarded to the microprocessor 15 via the IR receiver 42 which instructs the microprocessor 15 to review the current favorite program list and add the program title to the list, in the event the program title is not already on the list.

If the program title is currently on the favorite program list, the microprocessor 15 generates a message which is displayed on the display screen inquiring whether the viewer desires to delete the highlighted program title from the favorite program list. If so, the viewer depresses a DELETE key provided on the IR remote 40. Depression of the DELETE key commands the microprocessor 15 to delete the highlighted program title from the favorite program list.

Alternative methods of entering program titles on the favorite program list include depression of the FAV-STORE key when viewing a specific program. When the FAV-STORE key is depressed while viewing a program, the microprocessor 15 records the title of the program currently broadcasting on the selected channel by retrieving the program guide information associated with the selected channel from memory 20. The microprocessor 15 then stores the program title of the current program on the favorite program list if it is not there already. If the program title is already contained on the list, the microprocessor 15 generates the delete prompt as described above.

It is noted that the favorite program list generated by either method described above can be displayed on command of the viewer. The favorite program list identifies each occurrence of the programs contained in the current program guide. In other words, the favorite program list identifies, at a minimum, the time and channel of each occurrence of the programs. Further, in the event that no program on the favorite program list is contained in the program guide, the viewer is notified of this fact via a display screen.

The present invention also relates to a method of notifying a viewer when a favorite program is to be broadcast. The method allows the viewer to be notified in advance, via an on-screen message, that a program on the favorite program list will be broadcast in the near future. The viewer can specify how far in advance (e.g., 5 minutes, 30 minutes, etc.) the notification occurs.

Figure 5:
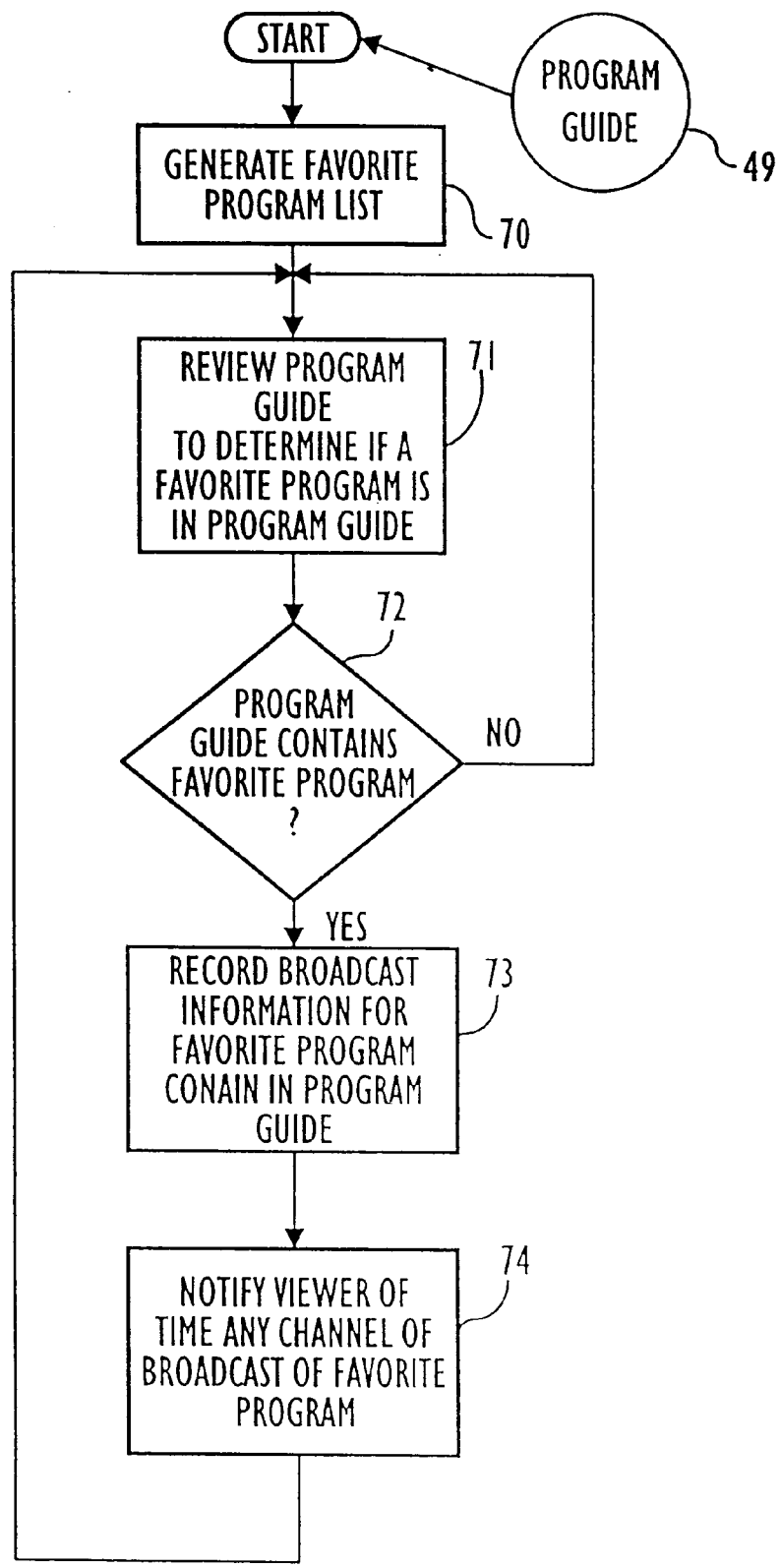
FIG. 5 is a flow chart illustrating a method of notifying a viewer when a predetermined favorite program is to be broadcast.

Referring to FIG. 5, the first step in the method (Step 70) comprises generating a favorite program list. This can be accomplished, for example, by any of the various methods described above. Once the viewer activates the apparatus 10, the microprocessor 15 periodically compares the favorite program list to the program guide 49 currently stored in memory 20 (Steps 71 and 72). In the event that a program on the favorite program list is contained in the program guide 49, the microprocessor 15 records the title of the program, the time of broadcast and the channel of broadcast (Step 73). Then, at a predetermined time prior to broadcast, the microprocessor 15 generates an on-screen message containing this information (Step 74).

In the event that a favorite program is being broadcast when the apparatus 10 is initially turned on, the microprocessor 15 will generate an on-screen message in the same manner as described above to inform the viewer that a favorite program is currently running. The message will indicate the title of the program, the channel of broadcast and that the program is currently on.

In the event that a plurality of favorite programs are to be broadcast at the same time, the on-screen message generated by the microprocessor 15 preferably lists all such programs, as well as their respective channels and start times.

The foregoing method also allows the viewer to command the microprocessor 15 to automatically tune the receiver to the channel broadcasting the favorite program at the appropriate time. More specifically, upon receiving an on-screen display indicating that a favorite program will be broadcast in the near future, the microprocessor 15 generates an "Auto-Tune" prompt which is also displayed on the display screen. If auto-tuning is desirable, the viewer depresses an AUTO-TUNE key provided on the IR remote 40. Depression of the AUTO-TUNE key commands the microprocessor 15 to record the channel and time of broadcast of the favorite program, and subsequently to tune the tuner 12 to the appropriate channel at the time of broadcast.

The method and apparatus of the present invention provides several important advantages over the prior art. Most importantly, the present invention allows the viewer to readily determine and identify when a desired program will be broadcast without the need for performing an extensive search of the entire channel guide for current and future events.

In addition, each of the favorite program lists described above can be employed to create timer events, which are utilized to control devices, such as a VCR for recording a future program. For example, a viewer can bring-up a favorite program list and select a program for which a timer event should be created. Upon selection of the program, the microprocessor 15 accesses the relevant information (i.e., date, time channel, length) which is stored in the favorite program list, and then forwards this information to the designated device at the appropriate time.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed is:

1. A method of searching a program guide comprising program information for a plurality of different program sources, said program information including titles of a plurality of programs, a channel on which each of the plurality of programs is to be shown, and a time at which each of a plurality of programs is to be shown, said method comprising the steps of:

entering a title of a desired program by selecting the title of the desired program from said program guide and interactively commanding a microprocessor to perform a search for the title of the desired program;

reviewing said program guide so as to identify an occurrence of the title of the desired program; and displaying the time and channel associated with the identified occurrence of the title of the desired program; wherein multiple titles of desired programs can be searched simultaneously.

2. The method of searching a program guide according to claim 1, wherein information relating to every identified occurrence of the desired program is displayed.

3. The method of searching a program guide according to claim 1, wherein said identified occurrences of the desired program include current and future programs.

4. The method of searching a program guide according to claim 1, wherein the identified occurrence of the desired program is stored in memory.

5. A method of generating a favorite program list from a program guide comprising program information for a plurality of different program sources, said program information includes the titles of the programs, said method comprising the steps of:

monitoring the duration of time a program is selected for viewing; and storing the titles of the program in memory means if said program is selected for viewing for a prespecified period of time, said titles of programs stored in said memory means forming said favorite program list, said favorite program list denoting the frequency with which each program is watched.

6. The method of generating a favorite program list according to claim 5, wherein said favorite program list includes the channel on which each program is to be shown, and the time at which each program is to be shown.

7. The method of generating a favorite program list according to claim 6, wherein said favorite program list is displayed.

8. The method of generating a favorite program list according to claim 5, wherein a viewer defines the duration of said prespecified period of time.

9. The method of generating a favorite program list according to claim 5, further comprising the step of:

deleting a title of a program stored in said memory means if said program is not selected for viewing for a prespecified period of time.

10. The method of generating a favorite program list according to claim 5, wherein said favorite program list is utilized to create a timer event.

11. An apparatus for generating a television program guide, said apparatus comprising:

means for receiving a signal, said signal including program information for a plurality of different program sources, said program information including titles of a plurality of programs, the channel on which each of the plurality of programs is to be shown, and the time at which each program is to be shown;

memory means coupled to said receiving means, said program information being stored in said memory means;

user input means for entering a title of a desired program;

a system controller coupled to said memory means and said user input means, said system controller operative for reviewing said program guide so as to identify an occurrence of the title of the desired program, the title of the desired program being selected from a program guide and by interactively commanding the system controller to perform a search for the title of the desired program; and display means coupled to said system controller, said display means operative for displaying the time and channel associated with an identified occurrence of the desired program;

wherein multiple titles of desired programs can be searched simultaneously.

12. The apparatus for generating a television program according to claim 11, wherein every identified occurrence of the desired program is displayed.

13. The apparatus for generating a television program according to claim 11, wherein said identified occurrences of the desired program include current and future programs.

14. The apparatus for generating a television program according to claim 11, wherein every identified occurrence of the desired program is stored in memory.

15. An apparatus for generating and ordering a favorite program list from a television program guide, said apparatus comprising:

means for receiving a signal, said signal including program information for a plurality of different program sources, said program information including the titles of the programs, the channel on which each program is to be shown, and the time at which each program is to be shown;

memory means coupled to said receiving means;

user input means for selecting a program for viewing;

a system controller coupled to said memory means and said user input means, said system controller operative for monitoring the duration of time a program is selected for viewing, and for storing the title of the program in said memory means if said program is selected for viewing for a prespecified period of time; and display means coupled to said system controller, said display means operative for displaying said titles of programs stored in said memory means forming said favorite program list, said favorite program list in said memory means denoting the frequency with which each program is watched.

16. The apparatus for generating a favorite program list according to claim 15, wherein said favorite program list includes the channel on which each program is to be shown, and the time at which each program is to be shown.

17. The apparatus for generating a favorite program list according to claim 15, wherein said system controller further operates to delete a title of a program stored in said memory means if said program is not selected for viewing for a prespecified period of time.

18. A method of searching a plurality of different program sources for program information including titles of a plurality of programs, a channel on which each program is to be shown and a time at which each program is to be shown comprising the steps of:

enabling a viewer to enter a title of a desired program by selecting the title of the desired program from said program guide and by interactively commanding a microprocessor to perform a search for the title of the desired program;

reviewing the plurality of program sources so as to identify each occurrence of the title of the desired program;

displaying the program source associated with each identified occurrence of the desired program including the time and channel;

wherein multiple titles of desired programs can be searched simultaneously.

19. The method of searching according to claim 18, wherein information relating to the desired program is displayed.

20. The method of searching according to claim 18, wherein the identified occurrences of the desired program include current and future programs along with the associated program source.

21. The method of searching according to claim 18, wherein each identified occurrence of the desired program is stored in memory.

22. A method of searching a program guide comprising program information for a plurality of different program sources, said program information including titles of a plurality of programs, a channel on which each of the plurality of programs is to be shown, and a time at which each of a plurality of programs is to be shown, said method comprising the steps of:

entering a title of a desired program by selecting the title of the desired program from said program guide and depressing a search key;

reviewing said program guide so as to identify an occurrence of the title of the desired program; and displaying the time and channel associated with the identified occurrence of the title of the desired program;

wherein multiple titles of desired programs can be searched simultaneously.

\* \* \* \* \*